United States Patent [19]

Lubin et al.

[11] Patent Number: 4,479,696
[45] Date of Patent: Oct. 30, 1984

[54] HOUSING FOR INTERFACING A SEMICONDUCTOR DEVICE WITH A FIBER OPTIC CABLE

[75] Inventors: Donald L. Lubin, Los Altos; John Uebbing, Palo Alto; Donald A. Shipley, Los Altos Hills; Rickson Sun, Palo Alto, all of Calif.

[73] Assignee: Hewlett-Packard Company, Palo Alto, Calif.

[21] Appl. No.: 478,217

[22] Filed: Mar. 24, 1983

Related U.S. Application Data

[63] Continuation of Ser. No. 166,721, Jul. 7, 1980, abandoned.

[51] Int. Cl.³ .............................................. G02B 7/26
[52] U.S. Cl. .................................. 350/96.20; 250/227; 357/74
[58] Field of Search ............... 350/96.20, 96.21, 96.22, 350/96.15; 250/227; 357/17, 30, 74

[56] References Cited

U.S. PATENT DOCUMENTS

| | | | |
|---|---|---|---|
| 3,806,225 | 4/1974 | Codrino | 350/96.20 |
| 4,188,708 | 2/1980 | Frederiksen | 350/96.15 X |
| 4,268,115 | 5/1981 | Slemon et al. | 350/96.20 X |
| 4,307,934 | 12/1981 | Palmer | 250/227 X |
| 4,427,879 | 1/1984 | Becher et al. | 350/96.15 X |

FOREIGN PATENT DOCUMENTS 2618095 11/1977 Fed. Rep. of Germany ... 350/96.20

OTHER PUBLICATIONS

Redmond, "Completely Integrated Fiber-Optic Link", *IBM Tech. Discl. Bulletin*, vol. 22, No. 9, Feb. 1980, pp. 3975-3976.

*Primary Examiner*—John D. Lee
*Attorney, Agent, or Firm*—Douglas A. Kundrat; Edward Y. Wong

[57] ABSTRACT

A housing for interfacing a fiber optic cable with a semiconductor device allows simple insertion and removal of the cable by application of an axial force. The housing exerts a spring-like gripping force upon the cable and axially aligns the cable to the semiconductor device in order to minimize loss of transmitted light. A portion of the gripping force is translated into an axial force by a slanted ridge within the housing which acts upon a ridge on the cable to cause the cable to be forcefully abutted to the semiconductor device.

6 Claims, 11 Drawing Figures

HOUSING FOR INTERFACING A SEMICONDUCTOR DEVICE WITH A FIBER OPTIC CABLE

CROSS REFERENCE TO RELATED APPLICATION

This is a continuation of application Ser. No. 166,721, filed July 7, 1980, now abandoned.

BACKGROUND OF THE INVENTION

When a fiber optic cable is interfaced to a semiconductor device special care must be taken if the amount of loss of the transmitted light is to be minimized. An angular misalignment between the cable and the device, as shown in FIG. 1A, may cause a loss of transmitted light. Losses in transmission may also occur if the fiber optic cable is axially misaligned with the semiconductor device as shown in FIG. 1B. Additionally, Fresnel losses may occur due to reflection if the transmitted light must pass between materials having different indices of refraction. For example, light transmitted from the semiconductor device to the fiber optic cable might pass through an epoxy layer on the device and through an air gap between the semiconductor device and the cable. The Fresnel loss may be calculated as:

$$T = \frac{4}{2 + n_2/n_1 + n_1/n_2},  \quad (1)$$

wherein T represents the transmissivity between two media having indices of refraction n1 and n2. If a gallium arsenide phosphide (GaASp) semiconductor device is used, the index of refraction (n) for GaAsP is 3.6; for clear epoxy, n is 1.5; and, for a fiber optic cable, n is 1.5. Thus, the loss in transmission for this exemplary case, can reach approximately 1.2 dB. In addition to the Fresnel losses the amount of axial separation between the cable and the semiconductor device (shown in FIG. 1C) also contributes some loss.

One prior art approach to minimizing light loss, shown in FIG. 2A, is to make the fiber optic cable an integral part of the semiconductor device. Such a semiconductor/cable combination, generally referred to as a "pig-tail," is clamped in place within a housing. This prior art approach promotes proper alignment and minimal Fresnel losses. The main disadvantage with "pig-tail" devices is the fragility due to having a delicate cable protrude from an equally delicate semiconductor device which necessitates special handling and greatly inhibits mechanical design flexibility.

An additional prior art device of the pig-tail type is shown in FIGS. 2B and 2C. A fiber optic cable is made to abut a semiconductor device and the combination is epoxied to form an integral unit. In this way Fresnel losses are minimized. However, losses due to mechanical misalignment during the epoxying process can still occur unless stringent alignment controls are enforced.

Another prior art approach is to use a screw-type mechanical connector to interface the cable with the semiconductor device. Typical connectors are shown in FIGS. 2D, 2E, and 2F. Because the cable must be screwed into a connector, cable connection is difficult, especially if space is limited. Further, a partial separation at the semiconductor/cable interface, and the resultant loss in light, may be hidden by the connector and may exist for a period of time before it is found and corrected.

SUMMARY OF THE INVENTION

In accordance with the illustrated preferred embodiment of the present invention a housing is provided to axially align with minimum separation a fiber optic cable and a semiconductor device. A fiber optic cable which is inserted into the housing is locked in by a pair of jaws exerting a spring-like gripping force and the cable can be inserted or detached by application of a predetermined axial force. Once locked into place in the housing the cable is self-aligned to minimize misalignment losses. A portion of the spring-like gripping force is translated into an axial force by a slanted ridge within the housing which acts upon a ridge on the cable to cause the cable to be forcefully abutted to the semiconductor device. Since no screw-type mechanical connectors are involved there is no need to provide additional space for tool manipulation. The special handling requirements and the fragility of a pig-tail device are eliminated.

DETAILED DESCRIPTION OF THE PREFERRED EMBODIMENT

Figure 1A:
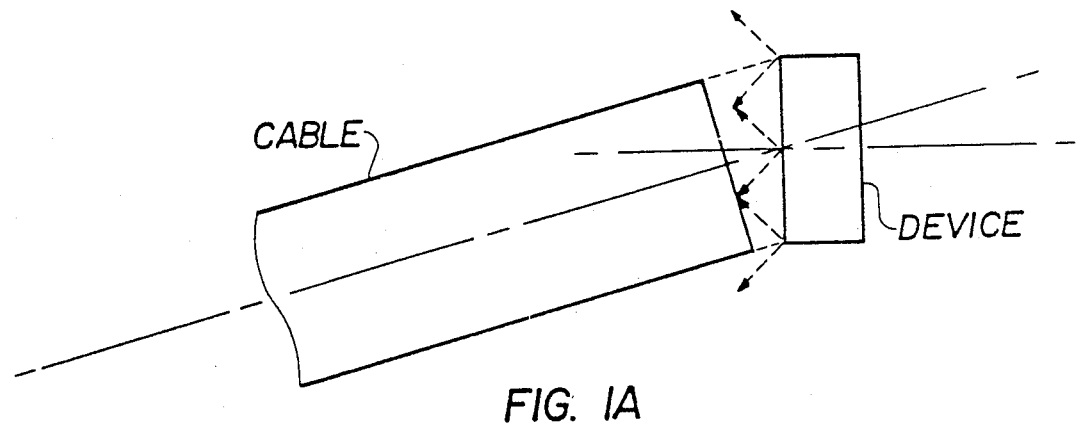
FIGS. 1A-C show the transmission of light when a fiber optic cable and a semiconductor device are improperly aligned or are separated.
Figure 1B:
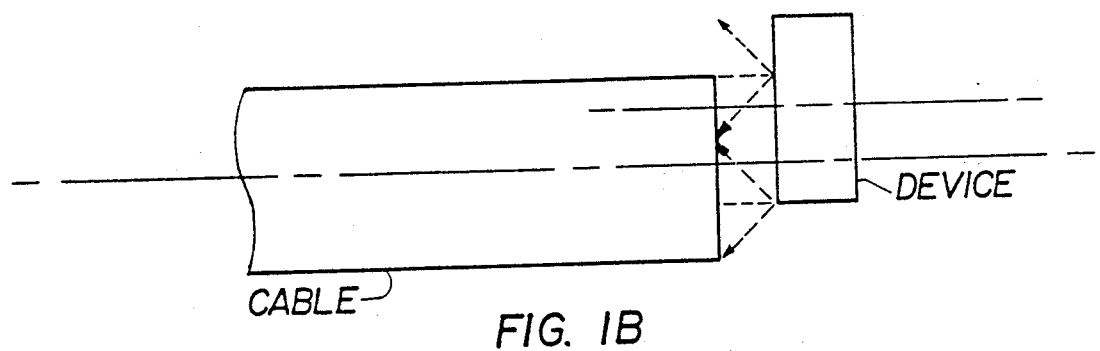
Figure 1C:
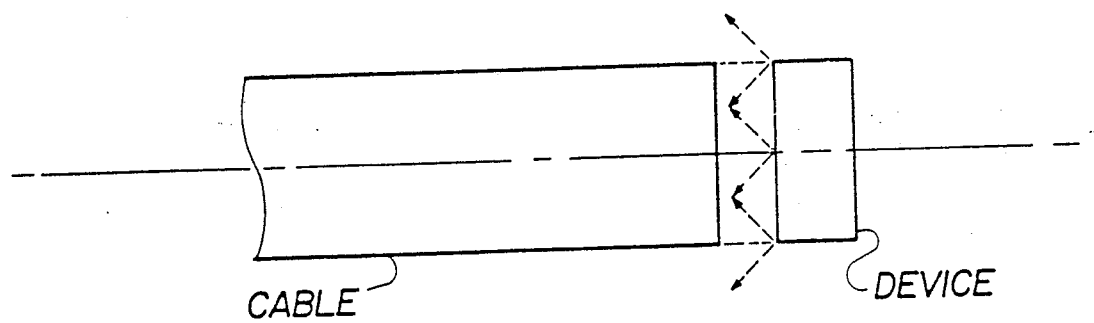
Figure 2A:
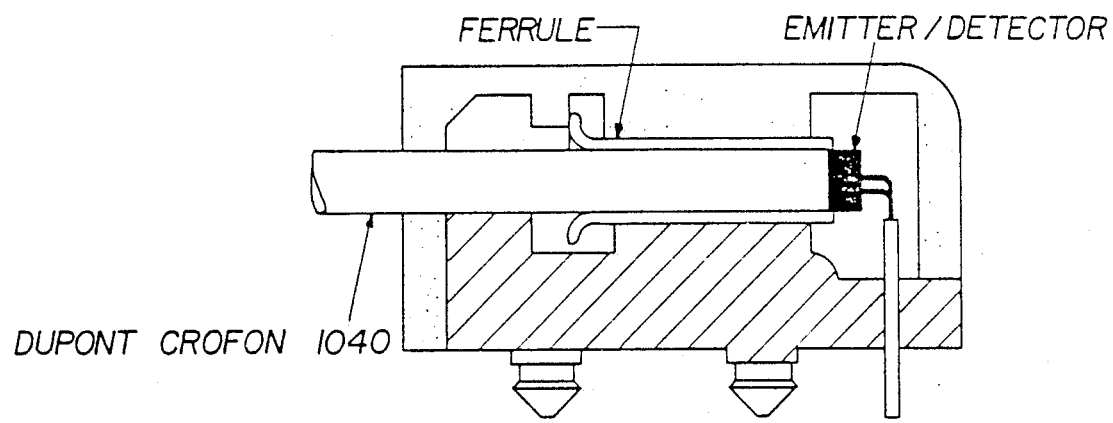
FIGS. 2A-F show various prior art interfacing devices.
Figure 2B:
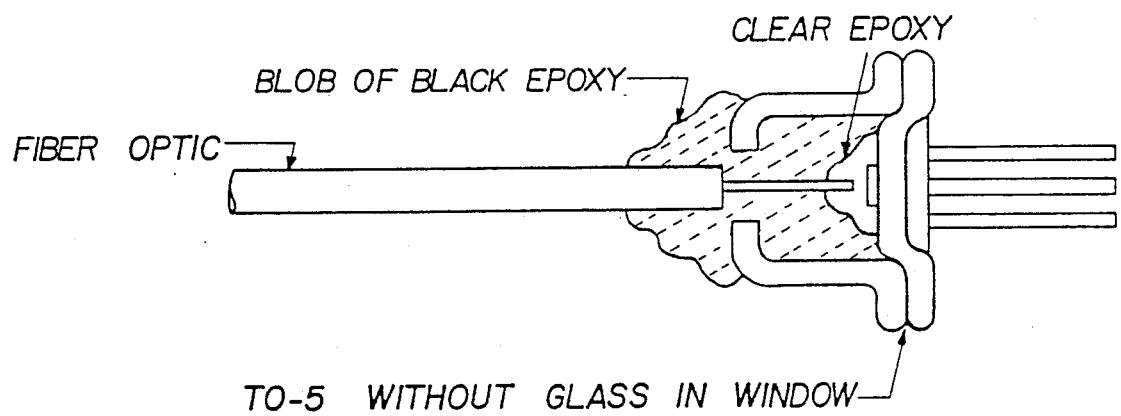
Figure 2C:
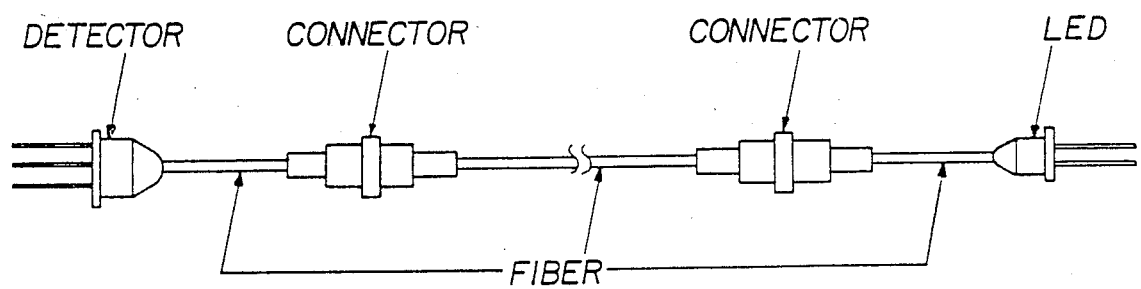
Figure 2D:
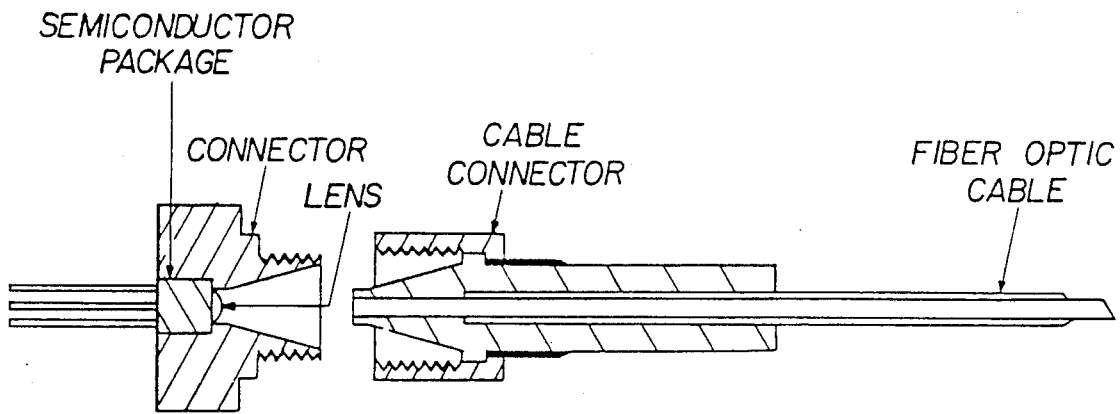
Figure 2E:
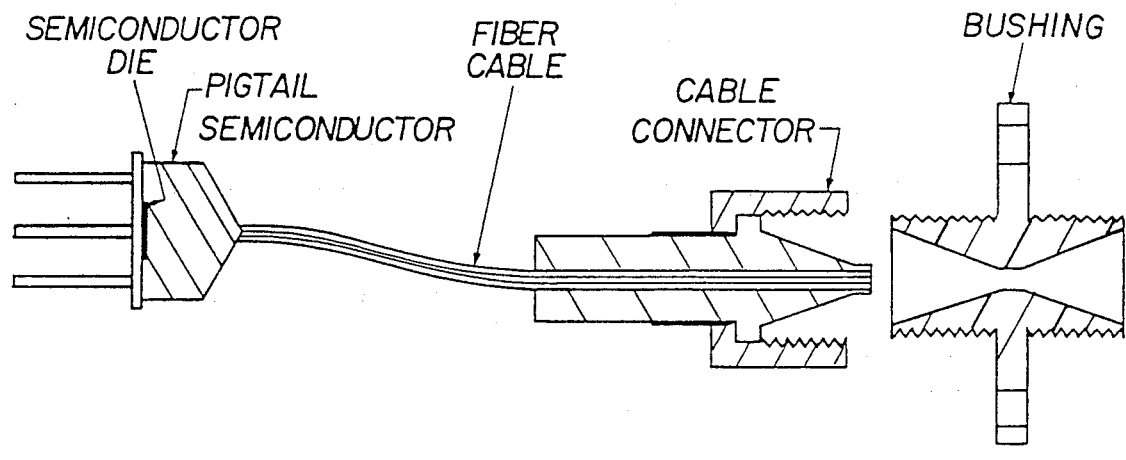
Figure 2F:
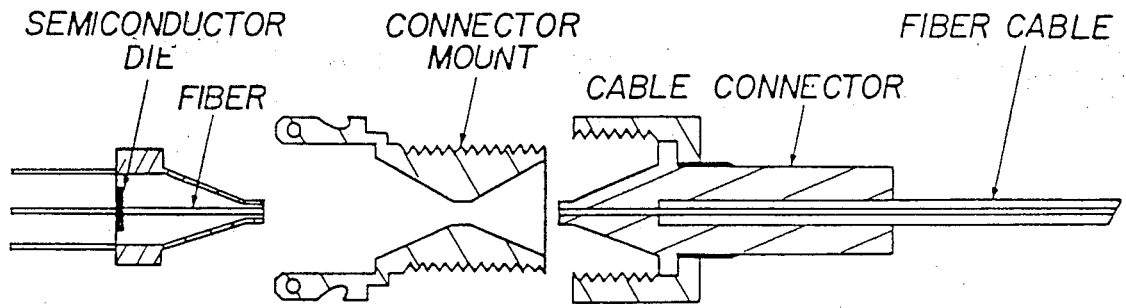
Figure 3:
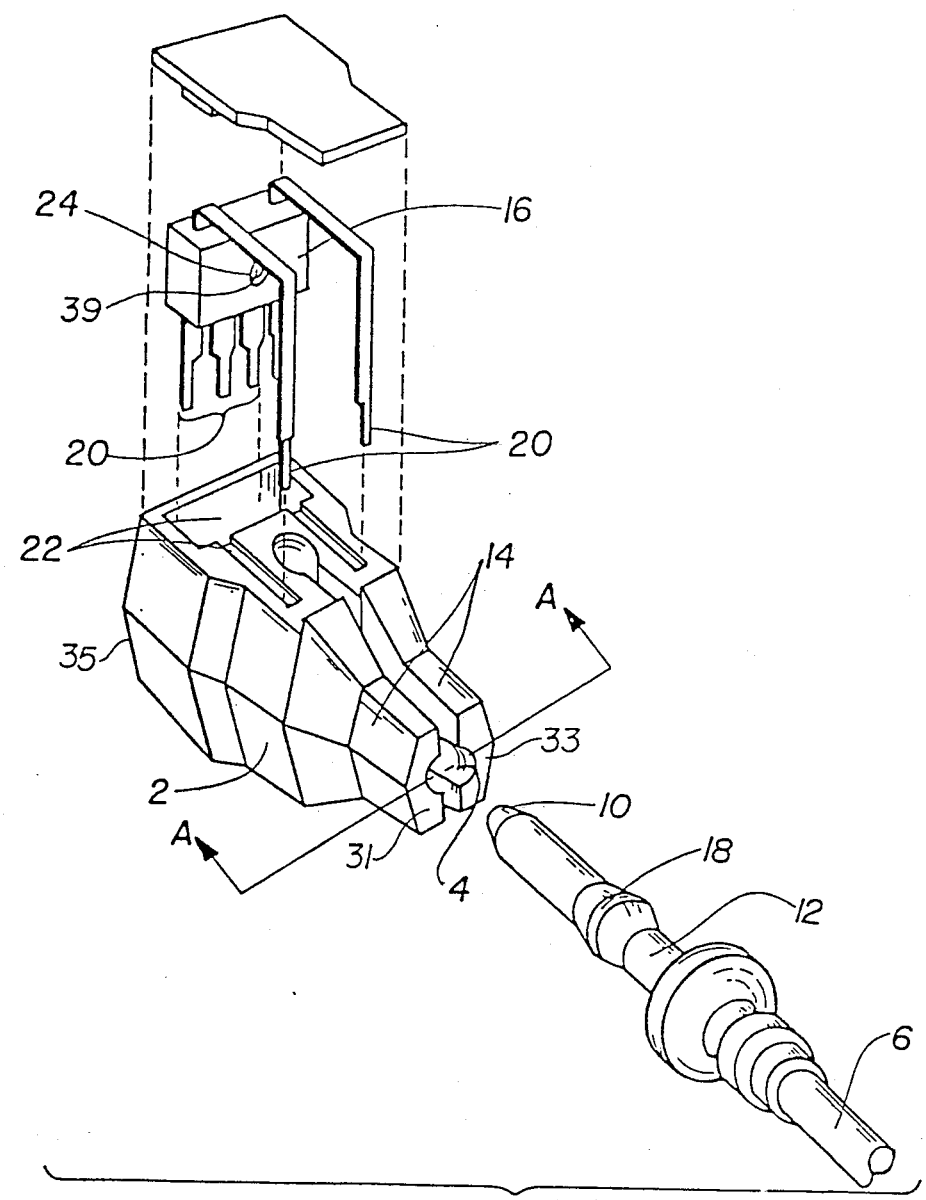
FIG. 3 shows a device which is constructed in accordance with the preferred embodiment of the present invention.
Figure 4:
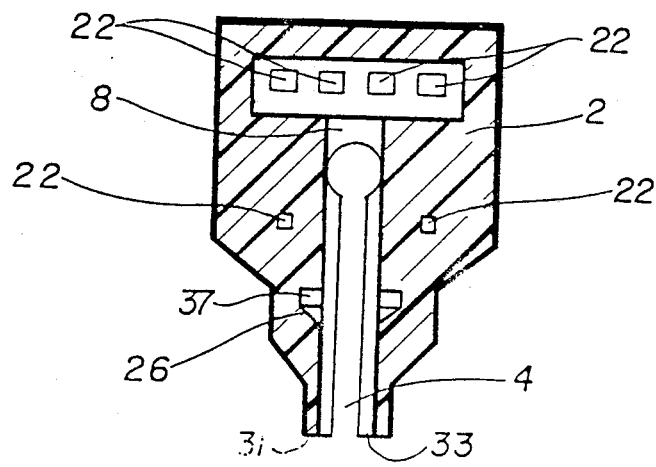
FIG. 4 is a cross-sectional view taken along line A—A of FIG. 3.

In FIGS. 3 and 4, a housing 2, typically molded from a resin-like acetal compound, includes a containment section 35 for containing a semiconductor device 16 and a slot 4 which is adapted to accept a fiber optic cable 6. The semiconductor device 16 is fabricated with a conical depression 24 to further receive the fiber optic cable 6. The slot 4 is constructed so that the cable 6 is automatically axially aligned therein by having a conical slot 8 which is adapted to allow the conical depression 24 of the semiconductor device 16 to receive a corresponding conical section 10 of the fiber optic cable 6. Conical section 10 may be located in a protective sleeve 12 which is attached to the end of the cable 6.

The cable 6 is locked in place by means of a mating section 14, adjacent the slot 4, which comprises jaws 31 and 33 and which exerts a spring-like gripping force against the cable 6 either directly or through the protective sleeve 12. The mating section 14 also forces the fiber optic cable 6 to abut the semiconductor device 16 for a more precise alignment even when the semiconductor device 16 is not rigidly fixed in relation to the housing 2. If a ridge 18 is included on the protective sleeve 12 the spring-like gripping force which is exerted on the sleeve 12 is translated into an axial force by a corresponding slanted ridge 26 which is located on an anterior surface of an annular gap 37 to aid in abutting the cable 6 directly against the semiconductor device 16.

Detachment of the cable 6 is achieved by exerting a tractive force to disengage cable 6 from housing 2. Because of the small size of the housing 2, which is typically only slightly larger than the semiconductor device 16, the housing 2 can be firmly attached to a printed circuit board with a solder connection of electrical leads 20. Cavities 22 allow the leads 20 to protrude.

Insertion of cable 6 into housing 2 may be better understood with additional reference to FIGS. 3 and 4. As cable 6 is inserted into housing 2, conical section 10 enters slot 4 and cable 6 spreads jaws 31 and 33 of mating section 14 slightly so that a spring-like gripping force is exerted upon cable 6 or sleeve 12. As cable 6 is inserted still further, additional insertion force is required so that jaws 31 and 33 spread an additional amount to admit ridge 18. When ridge 18 reaches slanted ridge 26, (and conical section 10 reaches conical slot 8) jaws 31 and 33 close upon cable 6 as ridge 18 is enclosed within annular gap 37. Thus, semiconductor device 16 is aligned with cable 6 by the reception of conical section 10 into conical slot 8 and opening 24; cable 6 is retained within housing 2 by the spring-like gripping force of jaws 31 and 33; and, inadvertent removal of cable 6 is discouraged because an additional tractive force is required to allow passage of ridge 18 between jaws 31 and 33. Further, if an outer portion of ridge 18 is slanted to conform to slanted ridge 26, then the spring-like force exerted by slanted ridge 26 upon ridge 18 contains normal and axial components. The normal component, in combination with the spring-like gripping force of jaws 31 and 33 upon cable 6 or sleeve 12, acts to retain cable 6 and the axial component acts to forcefully abut conical section 10 of the cable 6 against the semiconductor device 16.

In order to maximize light transmission, the semiconductor device 16 may include a lens 39 which is fabricated onto the semiconductor device 16 within the conical depression 24. When the lens 39 is present, most of the transmitted light can be focussed from the semiconductor device 16 to the fiber optic cable 6, or vice versa.

We claim:

1. An apparatus for interfacing a semiconductor device to a fiber optic cable having an annular ridge, said apparatus comprising a housing having:
   a containment section for containing the semiconductor device;
   first and second opposed and spreadable jaws extending from the containment section;
   a slot formed by the jaws and being in axial alignment with the containment section, said slot being operative for receiving and axially aligning the fiber optic cable with the semiconductor device; and
   an annular gap disposed around a portion of the slot and formed by the first and second jaws, the annular gap being bounded on an anterior side by a slanted ridge which is operative for exerting an axial tractive force upon the annular ridge of the fiber optic cable such that the fiber optic cable is seated against the semiconductor device.

2. An apparatus as in claim 1, wherein the slot further comprises a conical depression which is operative for receiving a conical tip of the fiber optic cable and for seating the conical tip against the semiconductor device.

3. An apparatus as in claim 2, wherein:
   the slot has an unspread inner diameter; and
   the annular ridge of the fiber optic cable has an outer diameter which is larger than the unspread inner diameter of the slot.

4. An apparatus as in claim 3, wherein:
   the fiber optic cable terminates in a conical section; and,
   a portion of the slot nearest the semiconductor device comprises a conical slot having substantially the same shape as the conical section.

5. An apparatus as in claim 4, wherein a lens is located within the housing between the fiber optic cable and the semiconductor device.

6. An apparatus as in claim 5, wherein the housing further comprises one or more cavities for the protrusion of one or more leads from the semiconductor device.

* * * * *